(12) United States Patent
Corey et al.

(10) Patent No.: US 11,944,515 B2
(45) Date of Patent: Apr. 2, 2024

(54) ORTHODONTIC DEVICES

(71) Applicant: Braces On Demand Inc., Hicksville, NY (US)

(72) Inventors: Colin James Corey, Carlsbad, CA (US); Ammar Ahmed Syed, Unionville (CA); Thomas Patrick Shannon, Byron Center, MI (US)

(73) Assignee: Braces On Demand, Inc., Hicksville, NY (US)

( * ) Notice: Subject to any disclaimer, the term of this patent is extended or adjusted under 35 U.S.C. 154(b) by 356 days.

(21) Appl. No.: 17/233,116

(22) Filed: Apr. 16, 2021

(65) Prior Publication Data

US 2022/0331069 A1  Oct. 20, 2022

(51) Int. Cl.
*A61C 7/28* (2006.01)

(52) U.S. Cl.
CPC ...................... *A61C 7/28* (2013.01)

(58) Field of Classification Search
CPC .............................. A61C 7/36; A61C 2202/00
See application file for complete search history.

(56) References Cited

U.S. PATENT DOCUMENTS

| | | | |
|---|---|---|---|
| 4,038,753 A | 8/1977 | Klein | |
| 4,462,800 A * | 7/1984 | Jones | A61C 7/36 433/22 |
| 5,098,288 A | 3/1992 | Kesling | |
| 5,183,388 A * | 2/1993 | Kumar | A61C 7/36 433/19 |
| 5,975,893 A | 11/1999 | Chisti | |
| 6,206,695 B1 | 3/2001 | Wong | |
| 7,648,360 B2 | 1/2010 | Kuo | |
| 7,940,258 B2 | 5/2011 | Stark | |
| 9,125,709 B2 | 9/2015 | Matty | |
| 9,226,803 B2 | 1/2016 | Cosse | |
| 10,136,966 B2 | 11/2018 | Reybrouck | |
| 10,179,035 B2 | 1/2019 | Shivapuja | |
| 10,314,673 B2 | 6/2019 | Schulhof | |
| 2002/0064759 A1 | 5/2002 | Durbin | |
| 2003/0207226 A1 * | 11/2003 | Forster | A61C 7/36 433/19 |
| 2004/0197725 A1 * | 10/2004 | Lluch | A61C 7/14 433/18 |
| 2004/0259049 A1 | 12/2004 | Kopelman | |

(Continued)

*Primary Examiner* — Ralph A Lewis
(74) *Attorney, Agent, or Firm* — Nixon Peabody LLP (57) ABSTRACT

In some embodiments, apparatuses and methods are provided herein useful to orthodontic appliances. In some embodiments, an orthodontic appliance comprises a main body portion including a first end and a second end, wherein the first end is opposite the second end, the main body portion comprising a first orthodontic device, wherein the first orthodontic device is configured to be bonded to a first tooth of a patient's mouth, and wherein the first orthodontic device is located to proximal the first end, and an eyelet, wherein the eyelet is located proximal to the second end, and a second orthodontic device, wherein the second orthodontic device is configured to be bonded to a second tooth of the patient's mouth, wherein the second orthodontic device includes a protrusion, and wherein the protrusion is located within the eyelet during use in the patient's mouth.

20 Claims, 10 Drawing Sheets

(56) References Cited

U.S. PATENT DOCUMENTS

| | | | |
|---|---|---|---|
| 2007/0020577 A1* | 1/2007 | Corcoran | A61C 7/36 |
| | | | 433/19 |
| 2007/0168152 A1 | 7/2007 | Matov | |
| 2008/0233528 A1 | 9/2008 | Kim | |
| 2009/0325120 A1 | 12/2009 | Lewis | |
| 2010/0285422 A1 | 11/2010 | Wiechmann | |
| 2011/0287378 A1 | 11/2011 | Dupray | |
| 2012/0135365 A1 | 5/2012 | Cleary | |
| 2013/0081271 A1 | 4/2013 | Farzin-Nia | |
| 2014/0212827 A1 | 7/2014 | Tzou | |
| 2014/0277659 A1 | 9/2014 | Kumar | |
| 2014/0326253 A1 | 11/2014 | Baratier | |
| 2016/0175074 A1* | 6/2016 | Cleary | A61C 7/18 |
| | | | 433/19 |
| 2017/0079747 A1 | 3/2017 | Graf | |
| 2017/0281317 A1 | 10/2017 | Bukhary | |
| 2018/0153651 A1 | 6/2018 | Tong | |
| 2018/0177570 A1 | 6/2018 | Alauddin | |
| 2018/0214258 A1 | 8/2018 | Ruan | |
| 2018/0235730 A1 | 8/2018 | Djamchidi | |
| 2018/0303583 A1 | 10/2018 | Tong | |
| 2018/0314235 A1 | 11/2018 | Mirabella | |
| 2018/0318048 A1* | 11/2018 | Voudouris | A61C 7/12 |
| 2019/0069980 A1 | 3/2019 | Kapec | |
| 2020/0123383 A1 | 4/2020 | Wallin | |
| 2020/0163742 A1* | 5/2020 | Suriano | A61C 7/14 |
| 2020/0275992 A1 | 9/2020 | Shannon | |
| 2020/0405446 A1* | 12/2020 | Shannon | B29C 64/40 |
| 2021/0015593 A1 | 1/2021 | Shannon | |
| 2021/0128275 A1 | 5/2021 | Suh | |
| 2022/0110721 A1 | 4/2022 | Shannon | |
| 2022/0202534 A1* | 6/2022 | Payne | B33Y 10/00 |
| 2022/0331069 A1* | 10/2022 | Shannon | A61C 7/28 |

\* cited by examiner

ORTHODONTIC DEVICES

TECHNICAL FIELD

This invention relates generally to orthodontics and, more specifically, orthodontic appliances.

BACKGROUND

Orthodontic clinicians seek to correct malocclusions by use of many different devices, such as braces, aligners, expanders, etc. Braces, otherwise known as brackets, are one of the most commonly used devices. Adjuncts to brackets include archwires, ligatures, and elastics. Brackets are affixed to a patient's teeth and the archwire passes through slots in the brackets designed to receive the archwire. The ligatures secure the archwire within the slots. Elastics attach brackets in the same dental arch or in opposing dental arches in order to provide additional orthodontic movement possibilities. In the treatment of some malocclusions, orthodontic clinicians may use Class II Correctors and/or Class III Correctors. Class II Correctors and Class III Correctors are typically bonded to two teeth in a patient's mouth and include a bar that spans the distance between the two teeth. Often, Class II Correctors and Class III Correctors feature a multipiece design, where the individual components are connected via a ball-and-socket mechanism. While a ball-and-socket mechanism is capable of providing Class II/III correction, this design has drawbacks. For example, such Class II Correctors and Class III Correctors are typically manufactured as discrete components to be assembled by the manufacturer or the orthodontic clinician. Such manufacturing techniques make the manufacture of such Class II Correctors and Class III Correctors more difficult, and expensive. Additionally, the required assembly of such Class II Correctors and Class III Correctors poses challenges for the manufacturer and/or orthodontic clinician. Accordingly, an improved design for Class II Correctors and Class III Correctors is desired.

BRIEF DESCRIPTION OF THE DRAWINGS

Disclosed herein are embodiments of systems, apparatuses, and methods pertaining orthodontic appliances. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to orthodontic appliances. In some embodiments, an orthodontic appliance comprises a main body portion including a first end and a second end, wherein the first end is opposite the second end, the main body portion comprising a first orthodontic device, wherein the first orthodontic device is configured to be bonded to a first tooth of a patient's mouth, and wherein the first orthodontic device is located to proximal the first end, and an eyelet, wherein the eyelet is located proximal to the second end, and a second orthodontic device, wherein the second orthodontic device is configured to be bonded to a second tooth of the patient's mouth, wherein the second orthodontic device includes a protrusion, and wherein the protrusion is located within the eyelet during use in the patient's mouth.

As previously discussed, typical Class II Correctors and Class III Correctors feature a multipiece design. Accordingly, the components of the Class II Corrector and Class III Corrector are manufactured separately and require assembly, whether by the manufacturer or a clinician. Because the components are manufactured separately, the complexity and cost of manufacture is increased. Additionally, assembly of the components to form the Class II Corrector and Class III Corrector can be difficult and/or cause frustration. Described herein are orthodontic appliances, as well as systems, methods, and apparatuses associated with orthodontic appliances, that seek to minimize, if not eliminate, the problems of traditional Class II Correctors and Class III Correctors. For the ease of readability, the following discussion will refer simply to Class II Correctors, though it should be noted that the teachings described herein can apply to both Class II Correctors and Class III Correctors.

In one embodiment, an orthodontic appliance (e.g., a Class II Corrector or a Class III Corrector) includes a main body portion and a second orthodontic device. The main body portion includes a first orthodontic device and an eyelet. The second orthodontic device seats within the eyelet during use of the orthodontic appliance in the patient's mouth. Due to this design, in some embodiments, the orthodontic appliance can be manufactured in an assembled state, making the manufacturing process less complex and removing the need for assembly of the orthodontic appliance after manufacture. The discussion of FIG. 1 provides an overview of such an orthodontic appliance.

Figure 1:
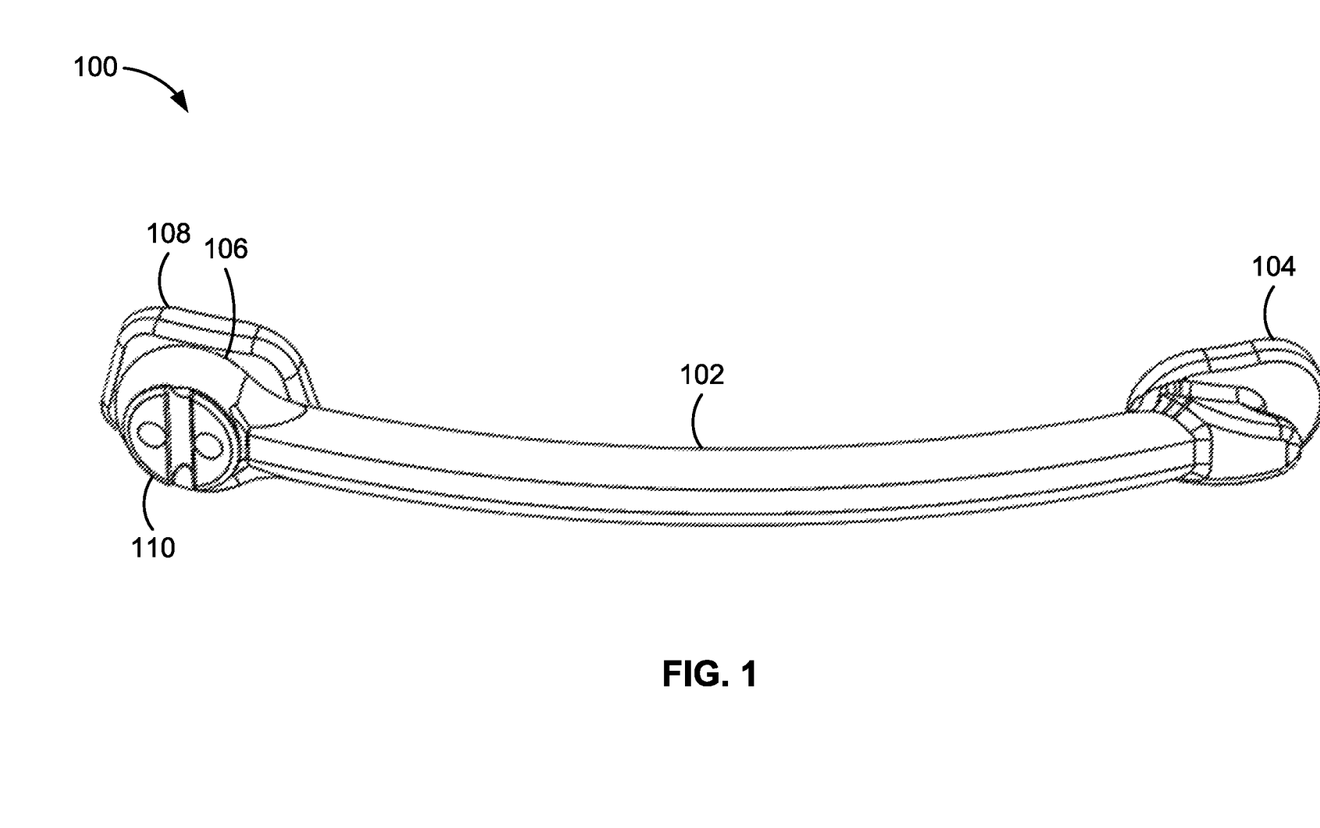
FIG. 1 is a perspective view of an orthodontic appliance 100, according to some embodiments.

FIG. 1 is a perspective view of an orthodontic appliance 100, according to some embodiments. The orthodontic appliance 100 comprises a main body portion 102 and a second orthodontic device 108. The main body portion 102 comprises a first orthodontic device 104 and an eyelet 106. In one embodiment, as depicted in FIG. 1, the main body portion 102 is an elongated member, and the first orthodontic device 104 is located at a first end of the main body portion 102 and the eyelet 106 is located at a second end of the main body portion 102. The main body portion 102 is securable to the second orthodontic device 108 to form the orthodontic appliance 100. In one embodiment, as depicted in FIG. 1, the second orthodontic device 108 includes a protrusion 110. The protrusion 110 seats (i.e., is located) within the eyelet 106 when the orthodontic appliance 100 is in use.

The first orthodontic device 104 is configured to be bonded to a first tooth in a patient's mouth. The first tooth can be any suitable tooth based, for example, on the patient's facial geometry, a prescription for the patient, the desired movement of the patient's teeth, etc. The second orthodontic device 108 is configured to be bonded to a second tooth in the patient's mouth. The second tooth can be any suitable tooth based, for example, on the patient's facial geometry, a prescription for the patient, the desired movement of the patient's teeth, etc. Though referred to as a "first tooth" and a "second tooth," it should be noted that the terms "first" and "second" do not indicate specific teeth within the patient's mouth with which the first orthodontic device 104 and second orthodontic device 108 are configured to be bonded. Rather, the use of the terms "first" and "second" simply denotes that, in use in a patient's mouth, the first orthodontic device 104 is bonded to a different tooth than the second orthodontic device 108. The first orthodontic device 104 and the second orthodontic device 108 can be bonded to the patient's teeth in any suitable manner. For example, the first orthodontic device 104 and the second orthodontic device 108 can be bonded to the patient's teeth via an adhesive.

The orthodontic appliance 100 can be manufactured from any suitable material(s). For example, the orthodontic appliance 100 can be manufactured from plastic, composite, metal, etc. Additionally, in some embodiments, the orthodontic appliance 100 can be manufactured from multiple materials. For example, the first orthodontic device 104 and the second orthodontic device 108 can be manufactured from metal, and other portions of the main body portion 102 can be manufactured from plastic. Accordingly, the orthodontic appliance 100 can be manufactured using any suitable manufacturing techniques, or combination of manufacturing techniques. For example, the orthodontic appliance 100 can be molded, cast, sculpted, additively manufactured, etc. In one embodiment, the main body portion 102 is manufactured separately from the second orthodontic device 108. In such embodiments, the orthodontic appliance 100 is assembled by inserting the protrusion 110 into the eyelet 106.

In another embodiment, the orthodontic appliance 100 is manufactured as a single structure. That is, the orthodontic appliance, as manufactured, includes both the main body portion 102 and the second orthodontic device 108. In such embodiments, because the orthodontic appliance 100 is manufactured as a single structure, the orthodontic appliance 100 does not require assembly (i.e., the main body portion 102 and the second orthodontic device are manufactured in an assembled state). In one embodiment, as described in more detail herein, the orthodontic appliance 100 is additively manufactured as a single structure. Additional detail regarding the additive manufacture of orthodontic appliances and systems can be found in U.S. patent application Ser. No. 16/875,618 filed May 15, 2020 and titled SYSTEMS AND METHODS FOR MANUFACTURE OF ORTHODONTIC APPLIANCES and U.S. patent application Ser. No. 17/011,121 filed Sep. 3, 2020 and titled SYSTEMS AND METHODS FOR MANUFACTURING ORTHODONTIC DEVICES, both of which are herein incorporated by reference in their entirety. With respect to U.S. patent application Ser. No. 17/011,121, the orthodontic kits can be analogized to the orthodontic appliance 100 and packaging described herein.

While the discussion of FIG. 1 provides an overview of the orthodontic appliances described herein, the discussion of FIGS. 2-5 provide additional detail regarding such orthodontic appliances and packaging that can be associated with the orthodontic appliances.

Figure 2A:
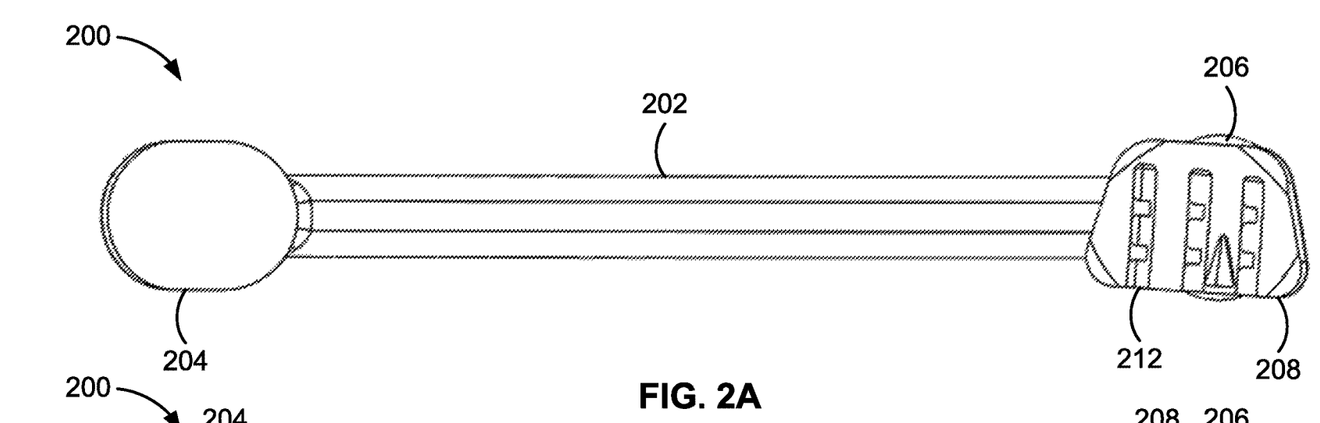
FIG. 2A is an elevation view of an orthodontic appliance 200, according to some embodiments.
Figure 2B:
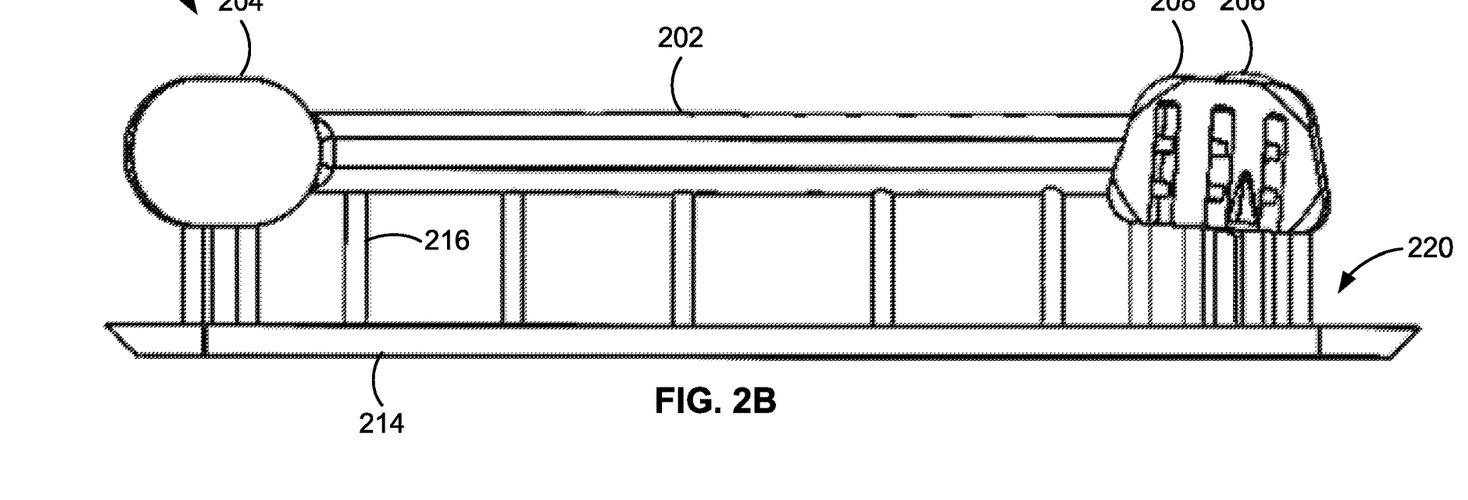
FIG. 2B is an elevation view of an orthodontic appliance 200 and packaging 220 for the orthodontic appliance 200, according to some embodiments.

FIG. 2A is an elevation view of an orthodontic appliance 200 and FIG. 2B is an elevation view of an orthodontic appliance 200 and packaging 220 for the orthodontic appliance 200, according to some embodiments. The orthodontic appliance 200 includes a main body portion 202 and a second orthodontic device 208. The main body portion 202 includes a first orthodontic appliance 206 proximal to a first end of the main body portion 202 and an eyelet proximal to a second end of the main body portion 202. The second orthodontic device 208 connects to the main body portion 202 via the eyelet 206 to form the orthodontic appliance 200.

The first orthodontic device 204 and the second orthodontic device 208 are configured to be bonded to teeth in the patient's mouth. For example, the first orthodontic device 204 can be bonded to a first tooth of the patient's mouth and the second orthodontic device 208 can be bonded to a second tooth of the patient's mouth. In one embodiment, the first orthodontic device 204 and/or the second orthodontic device 208 can include features (e.g., structures, shapes, etc.) to aid in bonding the first orthodontic device 204 and/or the second orthodontic device 208 to the patient's teeth. For example, as depicted in FIGS. 2A and 2B, the second orthodontic device 208 includes structures (i.e., dovetails 212) that can aid bonding. The dovetails 212 can allow excess bonding materials (e.g., an adhesive) to flow from behind the second orthodontic device 208. Though not depicted as including dovetails in FIGS. 2A and 2B, in some embodiments the first orthodontic appliance 204 includes dovetails. As another example, the shape of a bonding surface of the first orthodontic device 204 and/or the second orthodontic device 208 can aid in bonding. For example, as depicted in FIGS. 2A and 2B, both the first orthodontic device 204 and the second orthodontic device 208 feature curved bonding surfaces.

As depicted in FIG. 2B, the orthodontic appliance 200 is secured to packaging 220. The packaging 220 includes a base 214 and support structures 216. The support structures 216 secure the orthodontic appliance 200 to the base 214 and support the orthodontic appliance 200 when the orthodontic appliance 200 is secured to the base 214. The packaging 220 can be manufactured from any suitable material(s). For example, the packaging 220 can be manufactured from plastic, composite, metal, etc. Additionally, in some embodiments, the packaging 200 can be manufactured from multiple materials. For example, the base 214 can be manufactured from plastic and the support structures 216 can be manufactured from metal.

In some embodiments, the orthodontic appliance 200 and the packaging 220 are manufactured as a single structure. For example, the orthodontic appliance 200, including the main body portion 202 and the second orthodontic device 208, and the packaging 220, including the base 214 and support structures, can be additively manufactured as a single structure (i.e., as a kit). In such embodiments, the packaged orthodontic appliance (i.e., an orthodontic kit including the orthodontic appliance 200 and the packaging 220) can be additively manufactured based on a data file. In such embodiments, the data file includes instructions for additively manufacturing the packaged orthodontic appliance. When additively manufactured as a single structure, the orthodontic device 200 may not require assembly (i.e., it may be manufactured in its assembled state).

Alternatively, the orthodontic appliance 200 can be additively manufactured separately from the packaging 220. That is, the orthodontic appliance 200, or portions of the orthodontic appliance such as the main body portion 202 and/or the second orthodontic device 208, can be additively manufactured as a single structure(s) and the packaging, or portions of the packaging 220 such as the base 214 and/or the support structures 216, can be additively manufactured as a single structure(s) separate from those of the orthodontic appliance 200. In such embodiments, the components (e.g., the main body portion 202, orthodontic appliance 200, base 214, support structures 216, second orthodontic appliance 208, etc.) can be additively manufactured based on data files including instructions to additively manufacture the components.

Figure 3A:
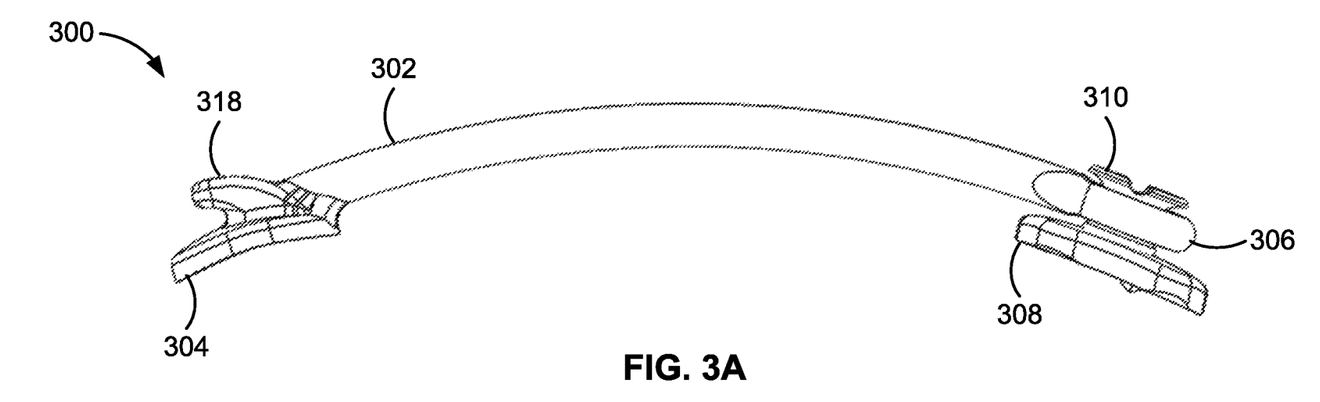
FIG. 3A is a top view of an orthodontic appliance 300, according to some embodiments.
Figure 3B:
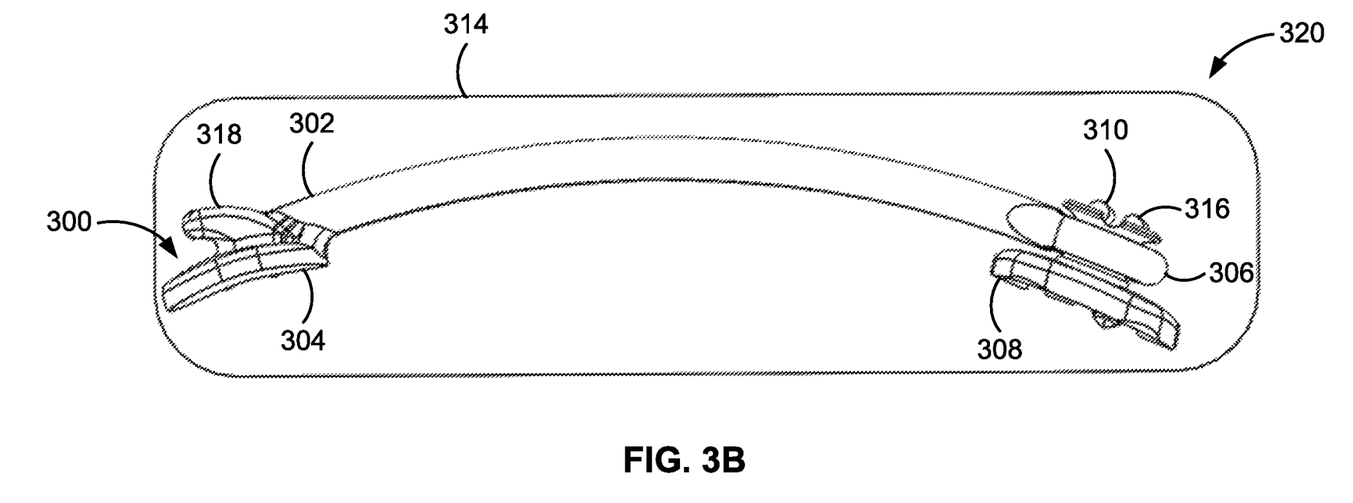
FIG. 3B is a top view of an orthodontic appliance 300 and packaging 320 for the orthodontic appliance 300, according to some embodiments.

FIG. 3A is a top view of an orthodontic appliance 300 and FIG. 3B is a top view of an orthodontic appliance 300 and packaging 320 for the orthodontic appliance 300, according to some embodiments. The orthodontic appliance 300 includes a main body portion 302 and a second orthodontic device 308. The main body portions 302 includes a first orthodontic device 304 and an eyelet 316. As depicted in FIGS. 3A and 3B, the first orthodontic device 304 includes a hook 318. In some embodiments, the first orthodontic appliance 304 is modular. That is, in some embodiments, the first orthodontic device 304 can be any suitable type of orthodontic device, such as a twin bracket, self-ligating bracket, tube, hook, or other mechanically advantageous attachment geometry. The modularity of the first orthodontic device 304 allows for a wide range of options.

The second orthodontic appliance 308 includes a protrusion 310. The second orthodontic appliance 308 is secured to the orthodontic appliance 300 via engagement of the protrusion 310 and the eyelet 306. For example, in use, the protrusion 310 is located within the eyelet 306. The interaction between the eyelet 306 and the protrusion 310 allows controlled movement of the main body portion 302 with respect to the second orthodontic device 308. For example, the main body portion 302 may be able to rotate about the protrusion 310. Additionally, dependent upon the geometry of the protrusion 310 and the eyelet 306, the main body portion 302 may be able to rotate in a plane perpendicular to the bonding surface of the second orthodontic device 208. In some embodiments, as discussed in more detail with respect to FIG. 6, the protrusion 310 includes a limit. In one embodiment, the limit is physically larger than an inner diameter of the eyelet 306. Such a design can limit movement of the main body portion 302 with respect to the second orthodontic device 308 and/or present disassembly of the orthodontic appliance 300.

As depicted in FIG. 3B, the orthodontic appliance 300 is secured to packaging 320 (i.e., a packaged orthodontic appliance is depicted). The packaging 320 includes a base 314 and support structures 316. The orthodontic appliance 300 is supported, and secured to the base 314, by the support structures 316.

Figure 4A:
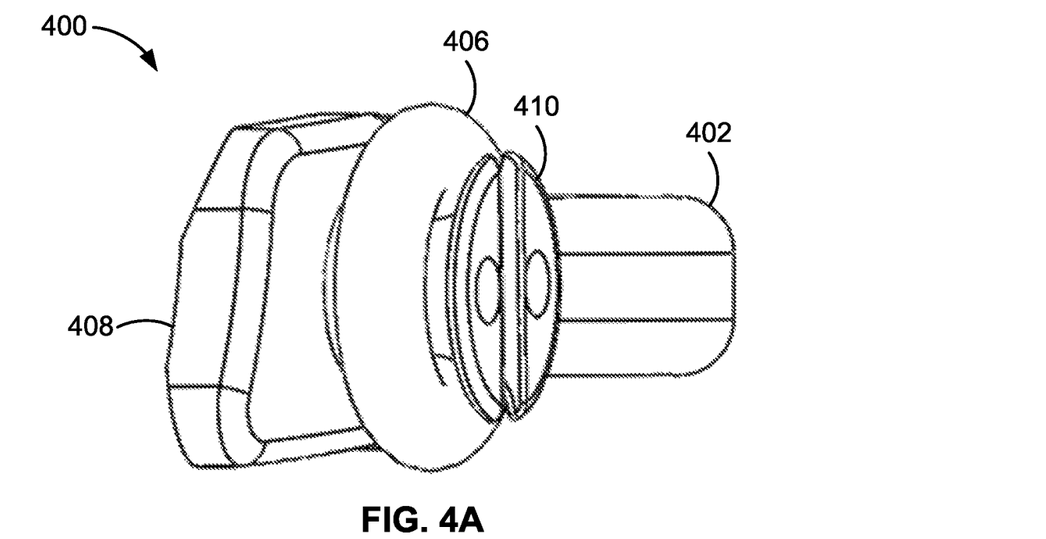
FIG. 4A is a side view of an orthodontic appliance 400, according to some embodiments.
Figure 4B:
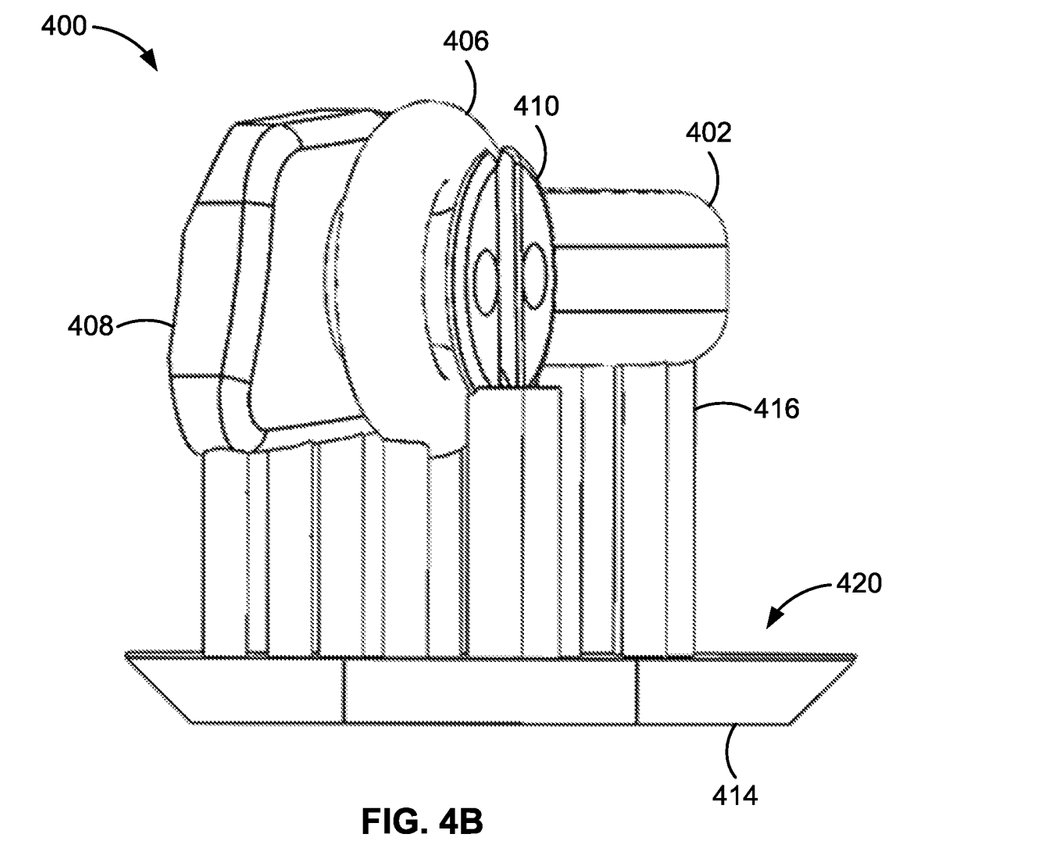
FIG. 4B is a side view of an orthodontic appliance 400 and packaging 420, according to some embodiments.

FIG. 4A is a side view of an orthodontic appliance 400 and FIG. 4B is a side view of an orthodontic appliance 400 and packaging 420, according to some embodiments. The orthodontic appliance 400 includes a main body portion 402 and a second orthodontic device 408. The main body portion 402 includes an eyelet 406. The second orthodontic device 408 includes a protrusion 410. When assembled, the protrusion 410 is located within the eyelet 406.

Depicted in FIG. 4B is a packaged orthodontic appliance. The packaged orthodontic appliance includes the orthodontic appliance 400 and packaging 420. The packaging 420 includes a base 414 and support structures 416. In embodiments in which the packaged orthodontic appliance is additively manufactured, the orthodontic appliance 400, the support structures 416, and the base 414 can be additively manufactured as a single structure. In such embodiments, the base 414 forms a base upon which the support structures 416 and the orthodontic appliance 400 are assembled. The support structures 416 support the orthodontic appliance 400 during manufacture and secure the orthodontic appliance 400 to the base 414.

Figure 5A:
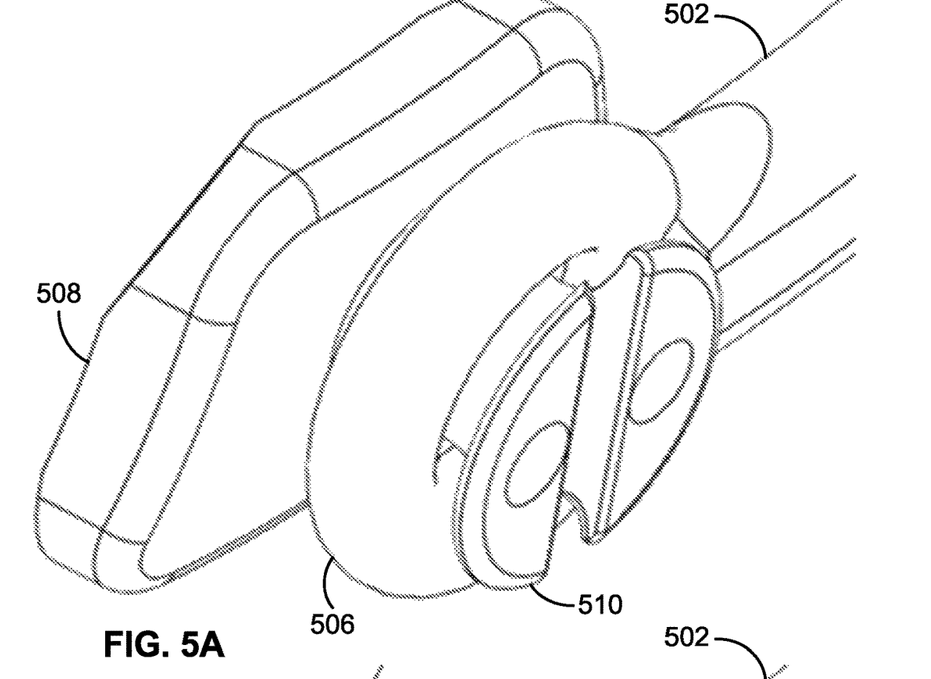
FIG. 5A is a perspective view of a second orthodontic device 508 of an orthodontic appliance, according to some embodiments.
Figure 5B:
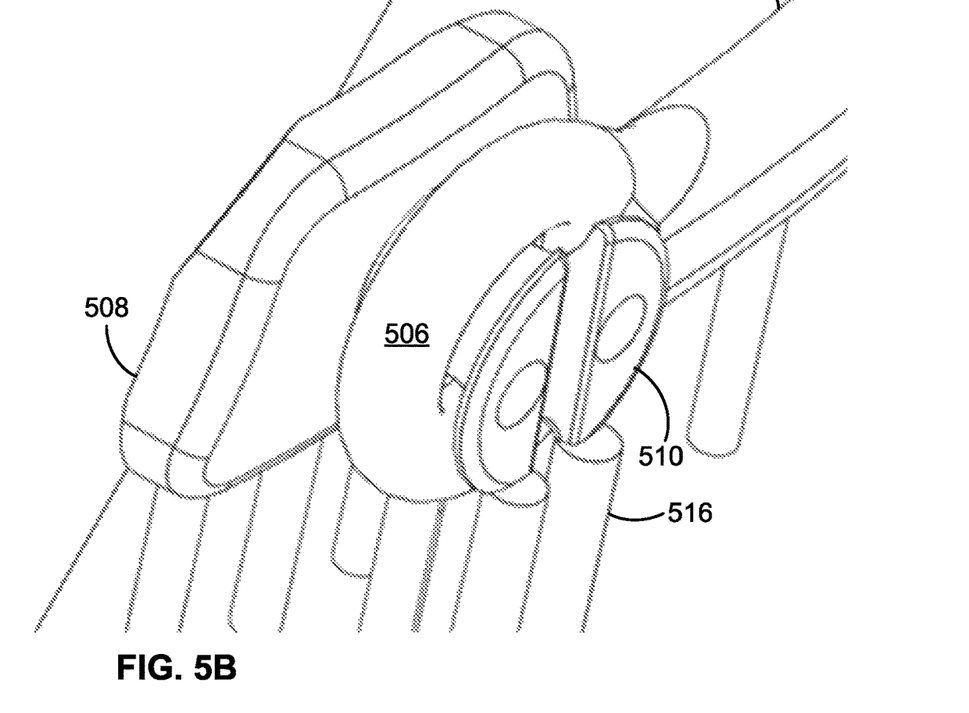
FIG. 5B is a perspective view of a second orthodontic device 508 of an orthodontic appliance including packaging, according to some embodiments.

FIG. 5A is a perspective view of a second orthodontic device 508 of an orthodontic appliance FIG. 5B is a perspective view of a second orthodontic device 508 of an orthodontic appliance including packaging, according to some embodiments. The second orthodontic device 508 is part of an orthodontic appliance. The orthodontic appliance includes a main body portion 502 and an eyelet 506. The second orthodontic device 508 includes a protrusion 510. When assembled, the protrusion 510 is located within the eyelet 506.

In FIG. 5B, the orthodontic appliance is depicted with packaging. The packaging includes a base 514 and support structures 516. In one embodiment, the orthodontic appliance and packaging are additively manufactured. For example, the base 514 can be additively manufactured and the support structures 516 and the orthodontic appliance can be additively manufactured on top of the base 514. In such embodiments, the support structures 516 provide surfaces on which the orthodontic appliance is manufactured and secure the orthodontic appliance to the base 514.

Figure 6:
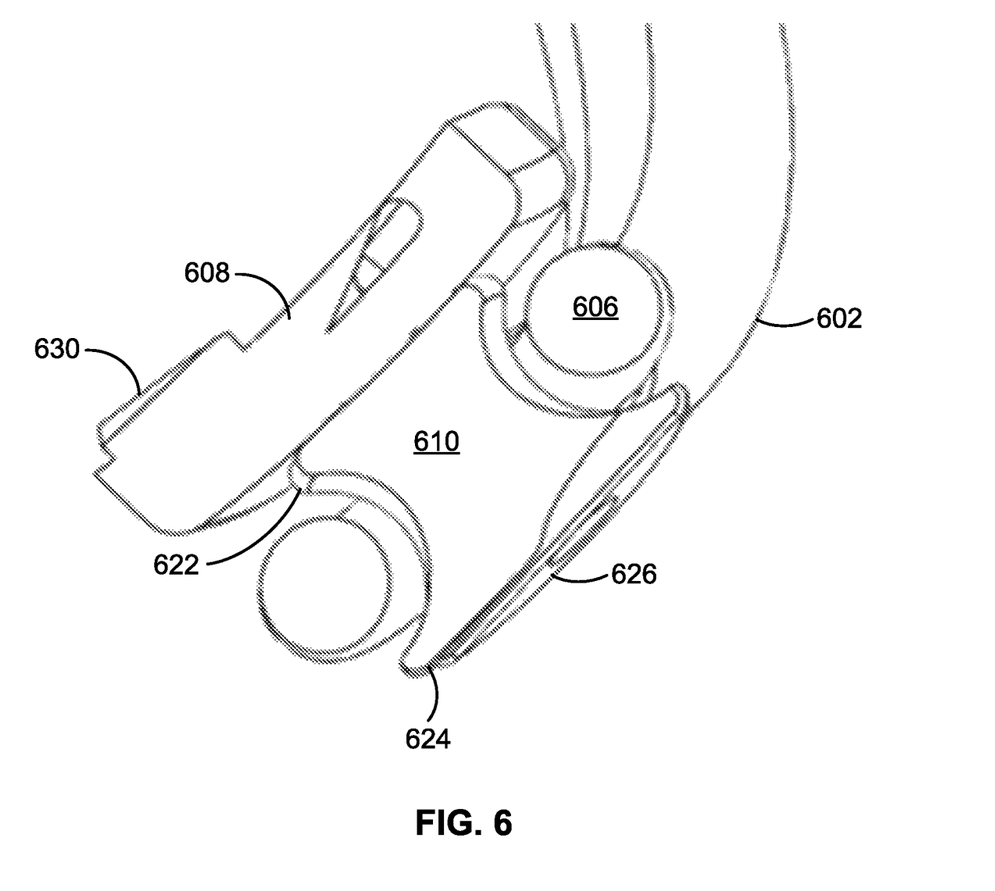
FIG. 6 is a sectional view of a second orthodontic device 608 and an eyelet 606 of a main body portion 602 of an orthodontic appliance, according to some embodiments.

While FIGS. 2-5 provide various views of orthodontic appliances and packaged orthodontic appliances (i.e., orthodontic appliances including packaging), FIG. 6 provides a sectional view of an orthodontic appliance.

FIG. 6 is a sectional view of a second orthodontic device 608 and an eyelet 606 of a main body portion 602 of an orthodontic appliance, according to some embodiments. The second orthodontic device 608 includes a protrusion 610. The protrusion 610 extends away from a bonding surface 630 of the second orthodontic appliance 608. When assembled, the protrusion 610 is located within the eyelet 606. As shown in the example depicted in FIG. 6, the eyelet 606 is circular in shape and includes an opening through which the protrusion 610 extends. Though the eyelet 606 has a circular cross section in FIG. 6, such is not required. That is, the cross section of the eyelet 606 can take any suitable shape. Additionally, the eyelet 606 can take any suitable shape and, for example, need not fully enclose the protrusion 610, as shown in FIGS. 7 and 8B.

The protrusion 610 can take any suitable shape and include any suitable features. For example, the protrusion 610 can be cylindrical, rectangular, spherical, etc. Accordingly, the eyelet 606 can take any suitable form to complement the protrusion 610. Additionally, as shown in the example depicted in FIG. 6, the protrusion 610 can include a number of features to control movement of the main body portion 602 with respect to the second orthodontic device 608 and/or retain the eyelet 606. For example, the protrusion 610 can include a protrusion base 622 and a protrusion end 624. The protrusion base 622 is located at a first end of the protrusion 610 and the protrusion end is located at a second end of the protrusion 610 (e.g., opposite the first end). In embodiments in which the protrusion 610 is cylindrical, the protrusion 610 may have a constant diameter from the protrusion base 622 to the protrusion end 624. However, a depicted in FIG. 6, the protrusion 610 may take a more complex shape. For example, the diameter of the protrusion 610 may vary between the protrusion base 622 and the protrusion end 624. In the example depicted in FIG. 6, the diameter of the protrusion 610 at a point between the protrusion base 622 and the protrusion end 624 may be smaller than the diameter of the protrusion 610 at the protrusion base 622 and/or the protrusion end 624. In such embodiments, the protrusion end 624 can form a limit 626. The limit 626 can control movement of the main body portion 602 with respect to the second orthodontic device 608 via physical engagement between the eyelet 606 and the limit 626. For example, for a Class II Corrector, it may be advantageous to limit rotation in a tip plane while allowing more freedom of rotation about the root axis. As another example, for a Class III Corrector, it may be advantageous to limit rotation about the root axis and allow tip rotation only in a positive direction. The geometries of the protrusion 610 and/or the eyelet 606 can be tailored to achieve these, as well as any other, movement restriction goals. Additionally, the limit 626 can prevent disassembly of the orthodontic appliance (i.e., removal of the eyelet 606 from the protrusion 626). Additionally, the degree to which the main body portion 602 can move with respect to the second orthodontic device 608 can be controlled by varying the size and/or geometry of the protrusion 610. For example, if more freedom of movement is desired, the diameter of the protrusion 610 between the protrusion base 622 and the protrusion end 624 can be decreased, or the diameter of the eyelet 606 can be decreased.

Figure 7A:
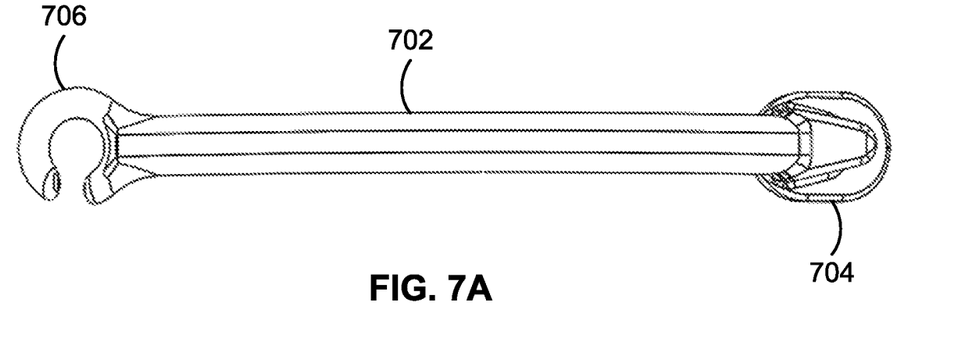
FIG. 7A is an elevation view of a main body portion 702 of an orthodontic appliance, according to some embodiments.
Figure 7B:
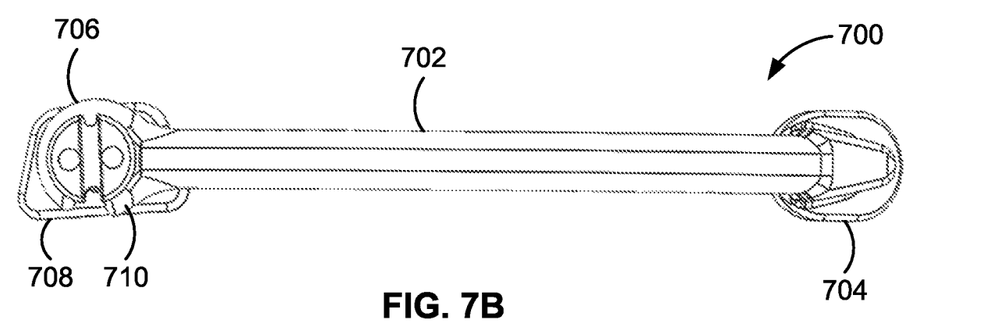
FIG. 7B is an elevation view of an orthodontic appliance 700, according to some embodiments.
Figure 7C:
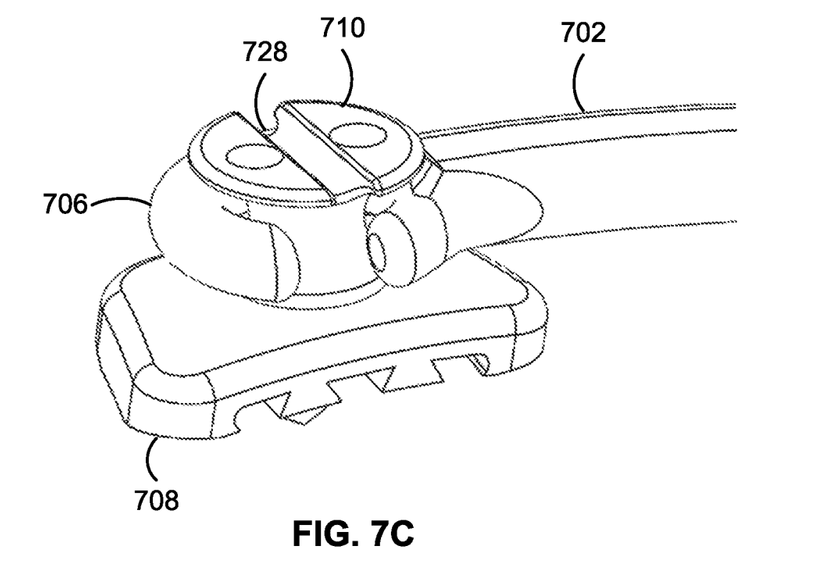
FIG. 7C is a perspective view of a second orthodontic device 708 and a main body portion 702 of an orthodontic appliance, according to some embodiments.

While the discussion of FIG. 6 provides additional detail regarding the protrusion of the second orthodontic device, the discussion of FIG. 7 provides additional detail regarding an eyelet of a main body portion of an orthodontic appliance.

FIG. 7A is an elevation view of a main body portion 702 of an orthodontic appliance, FIG. 7B is an elevation view of an orthodontic appliance 700, and FIG. 7C is a perspective view of the second orthodontic device 708 and the main body portion 702 of an orthodontic appliance, according to some embodiments. The orthodontic appliance 700 includes the main body portion 702 and the second orthodontic device 708. The main body portion 702 includes a first orthodontic device 704 and an eyelet 706. The first orthodontic device 704 is located at a first end of the main body portion 702 and the eyelet 706 is located at a second end of the main body portion 702. As previously discussed, the first orthodontic device 704 (and in some embodiments the second orthodontic device 708) can be modular. For example, as depicted in FIG. 3, the first orthodontic device includes a hook. In the example depicted in FIGS. 7A and 7B, the first orthodontic device 704 does not include a hook.

The second orthodontic device 708 includes a protrusion 710. When assembled, the protrusion 710 is located within the eyelet 706. That is, during use in a patient's mouth, the protrusion 710 is located within the eyelet 706. In some embodiments, the protrusion 710 includes features that can, for example, aid in controlling the movement of the main body portion 702, assembly and/or disassembly of the orthodontic appliance 700, etc. For example, as depicted in FIG. 7, the protrusion 710 includes a slot 728. As depicted in FIGS. 7B and 7C, the eyelet 706 does not fully encircle the protrusion 710. That is, the eyelet 706 does not form a closed loop. Such a design may facilitate easier assembly and/or disassembly of the orthodontic appliance 700, provide a greater range of movement of the main body portion 702 with respect to the second orthodontic device 708, etc.

Figure 8A:
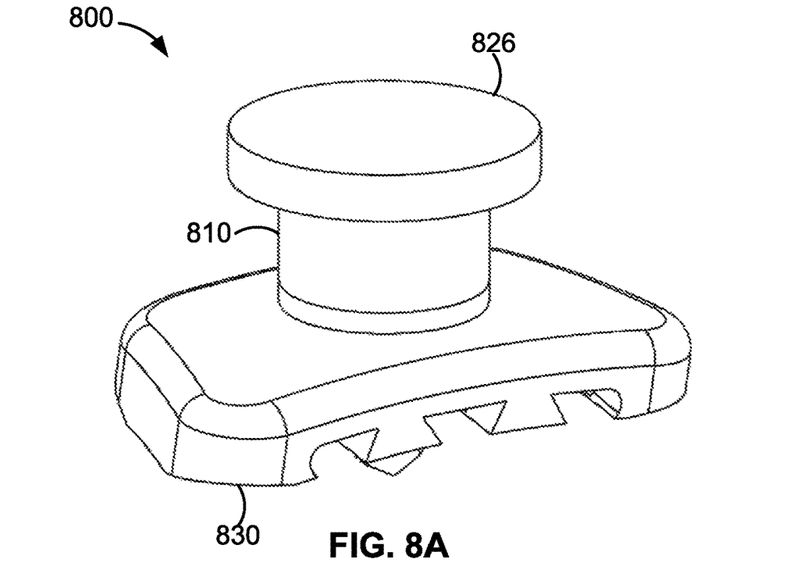
FIG. 8A is a perspective view of a second orthodontic device 808 of an orthodontic appliance, according to some embodiments.
Figure 8B:
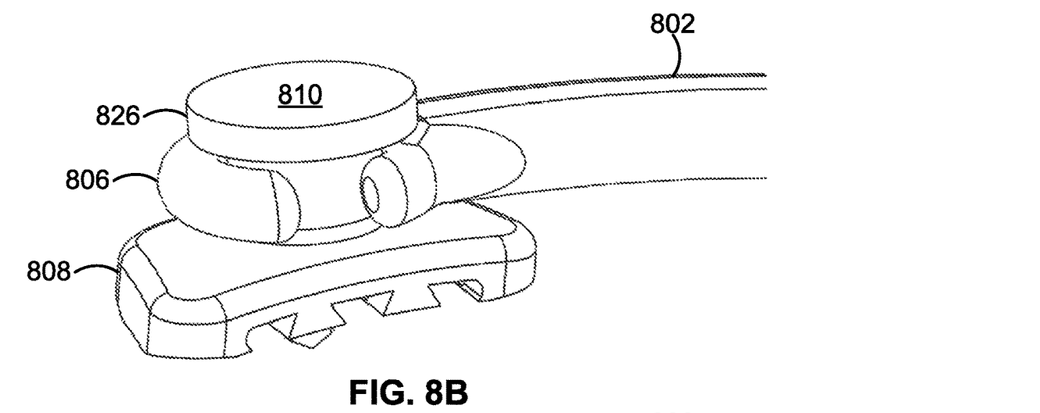
FIG. 8B is a perspective view of a second orthodontic device 808 within an eyelet 806 of an orthodontic appliance, according to some embodiments.
Figure 8C:
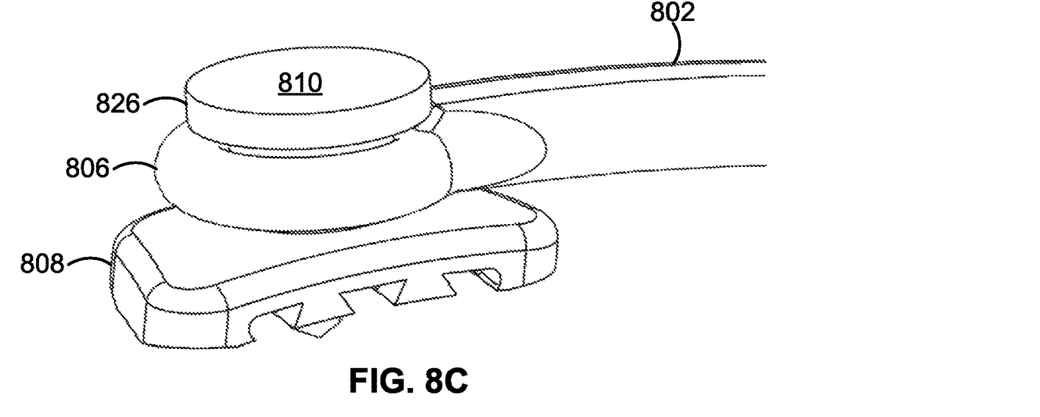
FIG. 8C is a perspective view of a second orthodontic device 808 within an eyelet 806 of an orthodontic appliance, according to some embodiments.

While the discussion of FIG. 7 provides additional detail regarding an eyelet of a main body portion of an orthodontic appliance, the discussion of FIG. 8 provides additional detail regarding an alternative embodiment of a protrusion of a second orthodontic device.

FIG. 8A is a perspective view of a second orthodontic device 808 of an orthodontic appliance, FIG. 8B is a perspective view of a second orthodontic device 808 within an eyelet 806 of an orthodontic appliance, and FIG. 8C is a perspective view of a second orthodontic device 808 within an eyelet 806 of an orthodontic appliance, according to some embodiments. While FIG. 6 depicts in an embodiment of a second orthodontic device including a protrusion that curves between a protrusion base and a protrusion end forming a protrusion with a varying diameter, FIG. 8 depicts an example of an alternative protrusion. The protrusion 810 depicted in FIG. 8 has a generally cylindrical shape and a "cap" at the protrusion end. The "cap" can be integral to the protrusion 810 or a separate piece that is affixed to the protrusion 610. Accordingly, the "cap" is generally a portion of the protrusion 810 that has a larger diameter than other portions of the protrusion 810. The "cap" forms a limit 626 with a dimension greater than that of the eyelet 806 (e.g., the width of the limit 626 can have a dimension greater than that of the eyelet 806). The limit 626 can control (e.g., limit) the movement of the main body portion 802 with respect to the second orthodontic device 808 and/or prevent disassembly of the orthodontic appliance.

As discussed with respect to FIG. 7 and shown in FIG. 8B, in some embodiments, the eyelet 806 is not a closed loop. That is, as depicted in FIG. 8B, the eyelet 806 does not fully enclose the protrusion 810. However, as depicted in FIG. 8C, in some embodiments, the eyelet 806 can be a closed loop at fully enclose the protrusion 810.

Figure 9:
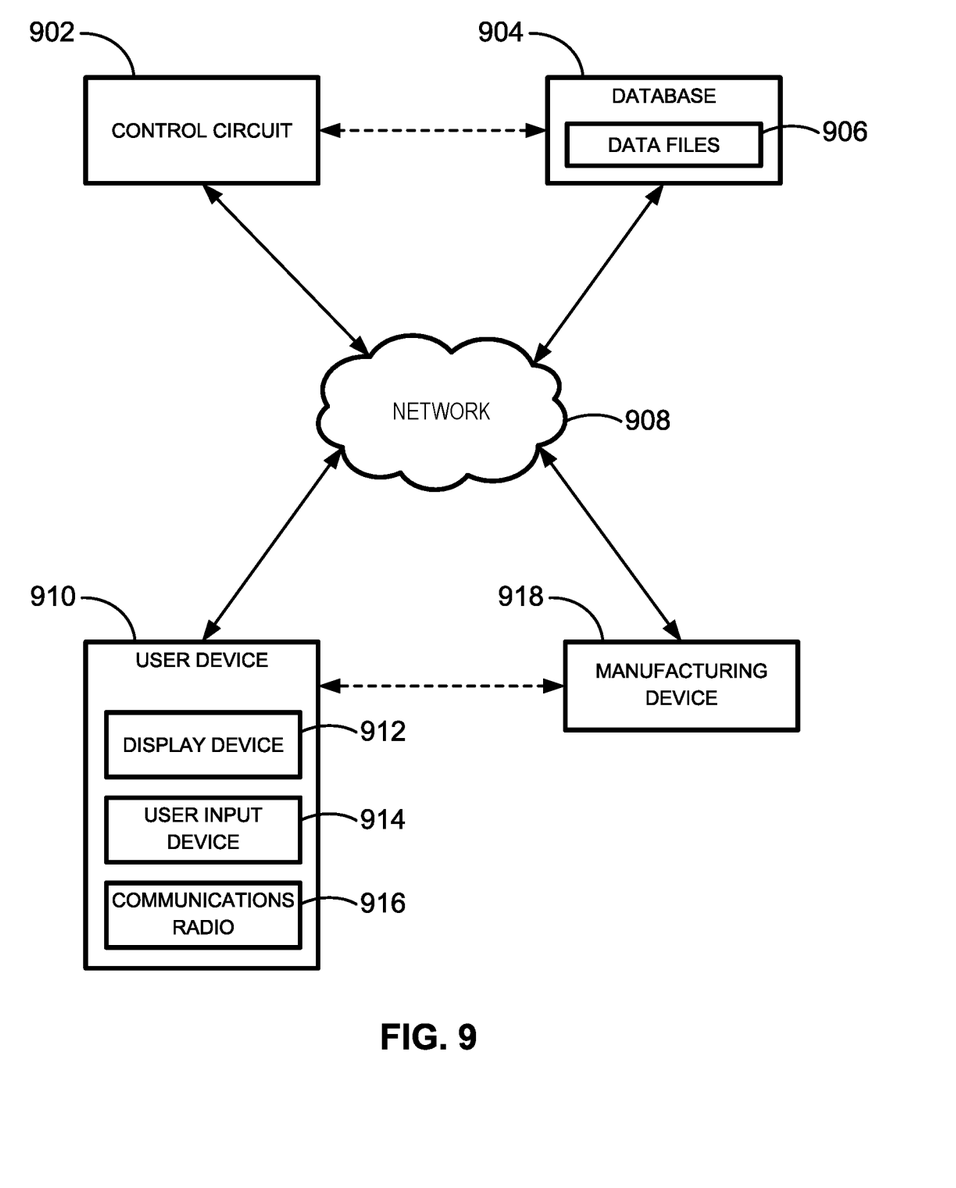
FIG. 9 is a block diagram of system 900 manufacturing orthodontic appliances, according to some embodiments.

While the discussion of FIG. 1-8 describes orthodontic appliances, the discussion of FIG. 9 provides additional detail regarding the manufacture of orthodontic appliances.

FIG. 9 is a block diagram of system 900 manufacturing orthodontic appliances, according to some embodiments. The system 900 includes a control circuit 902, a database 904, a user device 910, and a manufacturing device 918. One or more of the control circuit 902, the database 904, the user device 910, and the manufacturing device 918 are communicatively coupled via a network 908. The network 908 can include a local area network (LAN) and/or wide area network (WAN), such as the internet. Accordingly, the network 908 can include wired and/or wireless links.

The user device 910 can be any suitable type of computing device (e.g., a desktop or laptop computer, smartphone, tablet, etc.). The user device 910 includes a display device 912. The display device 912 is configured to present a catalogue to a user. The catalogue includes orthodontic appliances that the user can obtain via the system 900, such as the orthodontic appliances described herein (i.e., orthodontic appliances and/or packaged orthodontic appliances). For example, the catalogue can include all orthodontic devices that the user can purchase and/or manufacture via the manufacturing device 918. The user interacts with the catalogue via a user input device 914. The user can interact with the catalogue by navigating the catalogue, making selections from the catalogue, modifying orthodontic appliances included in the catalogue, etc. Accordingly, the user input device 914 can be of any suitable type, such as a mouse, keyboard, trackpad, touchscreen, etc. The user device 910 also includes a communications radio 916. The communications radio 916 transmits and receives information for the user device 910. For example, in the case of a smartphone, the communications radio 916 can be a cellular radio operating in accordance with the 4G LTE standard. Once a user has made a selection of an orthodontic appliance, the user device 910, via the communications radio 916 and the network 908, transmits an indication of the selection to the control circuit 902.

The control circuit 902 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 902 is configured (for example, by using corresponding programming as will be well understood by those skilled in the art) to carry out one or more of the steps, actions, and/or functions described herein.

By one optional approach the control circuit 902 operably couples to a memory. The memory may be integral to the control circuit 902 or can be physically discrete (in whole or in part) from the control circuit 902 as desired. This memory can also be local with respect to the control circuit 902 (where, for example, both share a common circuit board, chassis, power supply, and/or housing) or can be partially or wholly remote with respect to the control circuit 902 (where, for example, the memory is physically located in another facility, metropolitan area, or even country as compared to the control circuit 902).

This memory can serve, for example, to non-transitorily store the computer instructions that, when executed by the control circuit 902, cause the control circuit 902 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit may be remote from the user device 910 and/or the manufacturing device 918. For example, the user device 910 and the manufacturing device 918 may be located in a clinician's office (e.g., the user's office) whereas the control circuit 902, and possibly the database 904, are cloud-based. The control circuit 902 generally operates to retrieve data files 906 based on the user's selection of orthodontic appliances. The control circuit 902 retrieves the data files 906 from the database 904. The database 904 is configured to store the data files 906. The data files 906 are associated with orthodontic appliances and/or packaged orthodontic appliances (i.e., orthodontic appliances including packaging). The data files 906 are CAD files from which the orthodontic appliances and/or packaged orthodontic appliances can be manufactured. The database 904 stores a data file for each of the orthodontic appliances included in the catalogue and/or each of the orthodontic systems included in the catalogue. In one embodiment, the database 904 stores a data file for all possible permutations of each orthodontic appliance (e.g., every possible modification and/or combination or modifications for each orthodontic appliance). The control circuit 902 receives the indication of the orthodontic appliance and/or packaged orthodontic appliance and retrieves a data file based on the indication of the orthodontic appliance and/or packaged orthodontic appliance.

It should be noted that the indication of the orthodontic appliance may include more than one orthodontic appliance. For example, the indication of the orthodontic appliance can include multiple orthodontic appliances, such as full set of brackets or other orthodontic appliances for a patient or an orthodontic system including a carrier structure and an assembly structure. Accordingly, the data file can be a file including instructions and/or specifications for multiple orthodontic appliances as well as structures in addition to the orthodontic appliances. For example, the data file may include multiple data files and/or multiple specifications for a number of brackets.

After retrieving the data file, the control circuit 902 transmits the data file. In some embodiments, the control circuit 902 encrypts or otherwise protects the data file before transmission. The control circuit 902 can encrypt or otherwise protect the data file before transmission to prevent those other than the user from accessing the data file. Additionally, in some embodiments, the control circuit 902 can encrypt or otherwise protect the data file to control the user's access to the data file. For example, in some embodiments, the system is set up such that users pay on a per manufacture or per print basis. That is, the user does not purchase, and may not later have access to, the data file. Rather, the user purchases access to print or otherwise manufacture an orthodontic appliance based on the data file once (or other specified number of times).

Dependent upon the embodiment, the control circuit 902 transmits the data file to the user device 910, the manufacturing device 918, or a third-party device (e.g., a laboratory capable of manufacturing the orthodontic appliance for the user). To whom, or to what device, the data file is transmitted may also aid in achieving access control. For example, in one embodiment, the control circuit 902 transmits the data file directly to the manufacturing device 918. Because the data file is not transmitted to the user device 910, the data file may not be easily accessible by the user device 910. Further, if an entity that controls the control circuit 902 controls the manufacturing device 918, access may to files received by the manufacturing device 918 may be further limited. In some embodiments, the control circuit 902 transmits the data files to the user device 910. In such embodiments, the user device 910 transmits, via the communications radio (e.g., over a universal serial bus (USB) connection, wireless connection based on the 802.11 standard, etc.), the data files to the manufacturing device 918.

The manufacturing device 918 additively manufacturers the orthodontic appliance(s) and/or orthodontic system based on the data file. The manufacturing device 918 can be of any suitable type, such as a 3D printer. The manufacturing device 918 can be local to, or remote from, one or more of the control circuit 902 and the user device 910. For example, in one embodiment, the user device 910 and the manufacturing device 918 are located in the user's office (i.e., the user device 910 and the manufacturing device 918 are local to one another). Alternatively, the manufacturing device 918 may be located in a laboratory or some other facility that manufactures orthodontic appliances for the user.

Figure 10:
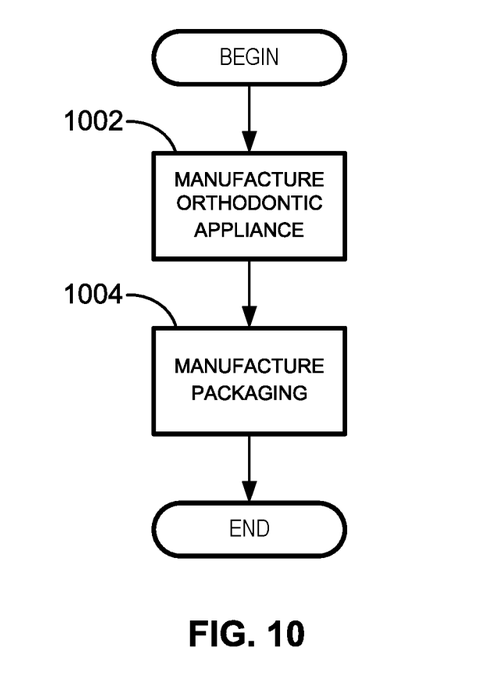
FIG. 10 is a flow chart depicting example operations for manufacturing orthodontic appliances, according to some embodiments.

While the discussion of FIG. 9 provides additional detail regarding the manufacture of orthodontic systems, the discussion of FIG. 10 describes example operations for manufacturing packaged orthodontic appliances.

FIG. 10 is a flow chart depicting example operations for manufacturing orthodontic appliances, according to some embodiments. The flow begins at block 1002.

At block 1002, an orthodontic appliance is manufactured. For example, the orthodontic appliance can be additively manufactured. The orthodontic appliance comprises a main body portion and a second orthodontic device. The main body portion comprises a first orthodontic device configured to be bonded to a patient's tooth that is located proximal to a first end of the main body portion and an eyelet that is located proximal to a second end of the main body portion. The second orthodontic device is configured to be bonded to a patient's tooth and includes a protrusion. During manufacture (i.e., during at least some periods during the manufacturing process of the orthodontic appliance), the protrusion is located within the eyelet. The flow continues at block 1004.

At block 1004, packaging is manufactured. For example, the packaging can be additively manufactured. The packaging includes a plurality of support structures and a base. The plurality of support structures supports the orthodontic appliance and secures the orthodontic appliance to the base.

In some embodiments, an orthodontic appliance comprises a main body portion including a first end and a second end, wherein the first end is opposite the second end, the main body portion comprising a first orthodontic device, wherein the first orthodontic device is configured to be bonded to a first tooth of a patient's mouth, and wherein the first orthodontic device is located to proximal the first end, and an eyelet, wherein the eyelet is located proximal to the second end, and a second orthodontic device, wherein the second orthodontic device is configured to be bonded to a second tooth of the patient's mouth, wherein the second orthodontic device includes a protrusion, and wherein the protrusion is located within the eyelet during use in the patient's mouth.

In some embodiments, a packaged orthodontic appliance comprises an orthodontic appliances, wherein the orthodontic appliance comprises a main body portion, the main body portion including a first end and a second end, wherein the first end is opposite the second end, the main body portion comprising a first orthodontic device, wherein the first orthodontic device is configured to be bonded to a first tooth of a patient's mouth, and wherein the first orthodontic device is located proximal to the first end, and an eyelet, wherein the eyelet is located proximal to the second end, and a second orthodontic device, wherein the second orthodontic device is configured to be bonded to a second tooth of the patient's mouth, wherein the second orthodontic device includes a protrusion, wherein the protrusion is located within the eyelet during manufacture, and packaging, wherein the packaging comprises a plurality of support structures, wherein the plurality of support structures supports the orthodontic appliance, and a base, wherein the plurality of support structures secures the orthodontic appliance to the base.

In some embodiments, an apparatus and a corresponding method performed by the apparatus comprises manufacturing an orthodontic appliance, wherein the orthodontic appliance comprises a main body portion, the main body portion including a first end and a second end, wherein the first end is opposite the second end, the main body portion comprising a first orthodontic device, wherein the first orthodontic device is configured to be bonded to a first tooth of a patient's mouth, and wherein the first orthodontic appliance is located proximal to the first end, and an eyelet, wherein the eyelet is located proximal to the second end, and an second orthodontic device, wherein the second orthodontic device is configured to be bonded to a second tooth of the patient's mouth, wherein the second orthodontic appliance includes a protrusion, wherein the protrusion is located within the eyelet during manufacture, and manufacturing the packaging, wherein the packaging comprises a plurality of support structures, wherein the plurality of support structures supports the orthodontic appliance, and a base, wherein the plurality of support structures secures the orthodontic appliance to the base.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An orthodontic appliance, the orthodontic appliance comprising:
   a main body portion, the main body portion including a first end and a second end, wherein the first end is opposite the second end, wherein the main body portion is monolithically formed, the main body portion comprising:
      a first orthodontic device, wherein the first orthodontic device is configured to be bonded to a first tooth of a patient's mouth, and wherein the first orthodontic device is located proximal to the first end; and
      an eyelet, wherein the eyelet is located proximal to the second end; and
   a second orthodontic device, wherein the second orthodontic device is configured to be bonded to a second tooth of the patient's mouth, wherein the second orthodontic device includes a protrusion, wherein the protrusion extends from the second orthodontic device substantially perpendicularly to the second tooth of the patient's mouth, and wherein the protrusion is located within the eyelet during use in the patient's mouth.

2. The orthodontic appliance of claim 1, wherein the protrusion includes a limit, wherein the limit limits motion of the main body portion with respect to the second orthodontic device.

3. The orthodontic appliance of claim 2, wherein the limit is a portion of the protrusion with a dimension greater than that of the eyelet.

4. The orthodontic appliance of claim 1, wherein the protrusion is cylindrical in shape, wherein the protrusion has a protrusion base and a protrusion end, wherein a diameter of the protrusion at a point between the protrusion base and the protrusion end is less than a diameter of the protrusion at the protrusion end.

5. The orthodontic appliance of claim 1, wherein the orthodontic appliance is additively manufactured as a single structure.

6. The orthodontic appliance of claim 1, wherein the first orthodontic appliance is modular.

7. The orthodontic appliance of claim 1, wherein the eyelet fully encloses the protrusion during use in the patient's mouth.

8. A packaged orthodontic appliance, the packaged orthodontic appliance comprising:
an orthodontic appliance, wherein the orthodontic appliances comprises:
a main body portion, wherein the main body portion is monolithically formed, the main body portion including a first end and a second end, wherein the first end is opposite the second end, the main body portion comprising:
a first orthodontic device, wherein the first orthodontic device is configured to be bonded to a first tooth of a patient's mouth, and wherein the first orthodontic device is located proximal to the first end; and
an eyelet, wherein the eyelet is located proximal to the second end; and
a second orthodontic device, wherein the second orthodontic device is configured to be bonded to a second tooth of the patient's mouth, wherein the second orthodontic device includes a protrusion, wherein the protrusion extends from the second orthodontic device substantially perpendicularly to the second tooth of the patient's mouth, and wherein the protrusion is located within the eyelet during manufacture; and
packaging, wherein the packaging comprises:
a plurality of support structures, wherein the plurality of support structures supports the orthodontic appliance; and
a base, wherein the plurality of support structures secures the orthodontic appliance to the base.

9. The packaged orthodontic appliance of claim 8, wherein the protrusion includes a limit, wherein the limit limits motion of the main body portion with respect to the second orthodontic device.

10. The packaged orthodontic appliance of claim 9, wherein the limit is a portion of the protrusion with a dimension greater than that of the eyelet.

11. The packaged orthodontic applicant of claim 8, wherein the protrusion is cylindrical in shape, wherein the protrusion has a protrusion base and a protrusion end, wherein a diameter of the protrusion at a point between the protrusion base and the protrusion end is less than a diameter of the protrusion at the protrusion end.

12. The packaged orthodontic appliance of claim 8, wherein the packaged orthodontic appliance is manufactured as a single structure.

13. The packaged orthodontic appliance of claim 8, wherein the packaged orthodontic appliance is additively manufactured.

14. The packaged orthodontic appliance of claim 8, wherein the eyelet fully encloses the protrusion during use in the patient's mouth.

15. A method for manufacturing a packaged orthodontic appliance, the method comprising
manufacturing the orthodontic appliance, wherein the orthodontic appliance comprises:
a main body portion, wherein the main body portion is monolithically formed, the main body portion including a first end and a second end, wherein the first end is opposite the second end, the main body portion comprising:
a first orthodontic device, wherein the first orthodontic device is configured to be bonded to a first tooth of a patient's mouth, and wherein the first orthodontic device is located proximal to the first end; and
an eyelet, wherein the eyelet is located proximal to the second end; and
a second orthodontic device, wherein the second orthodontic device is configured to be bonded to a second tooth of the patient's mouth, wherein the second orthodontic device includes a protrusion, wherein the protrusion extends from the second orthodontic device substantially perpendicularly to the second tooth of the patient's mouth, and wherein the protrusion is located within the eyelet during manufacture;
manufacturing the packaging, wherein the packaging comprises:
a plurality of support structures, wherein the plurality of support structures supports the orthodontic appliance; and
a base, wherein the plurality of support structures secures the orthodontic appliance to the base.

16. The method of claim 15, wherein the protrusion includes a limit, wherein the limit limits motion of the main body portion with respect to the second orthodontic device.

17. The method of claim 16, wherein the limit is a portion of the protrusion with a dimension greater than that of the eyelet.

18. The method of claim 16, wherein the protrusion is cylindrical in shape, wherein the protrusion has a protrusion base and a protrusion end, wherein a diameter of the protrusion at a point between the protrusion base and the protrusion end is less than a diameter of the protrusion at the protrusion end.

19. The method of claim 15, wherein the packaged orthodontic appliance is manufactured as a single structure.

20. The method of claim 15, wherein the packaged orthodontic appliance is additively manufactured.

* * * * *